F. MÜLLER.
METHOD OF MAKING MILLING CUTTERS.
APPLICATION FILED MAR. 31, 1919.
1,348,308.
Patented Aug. 3, 1920.
6 SHEETS—SHEET 6.
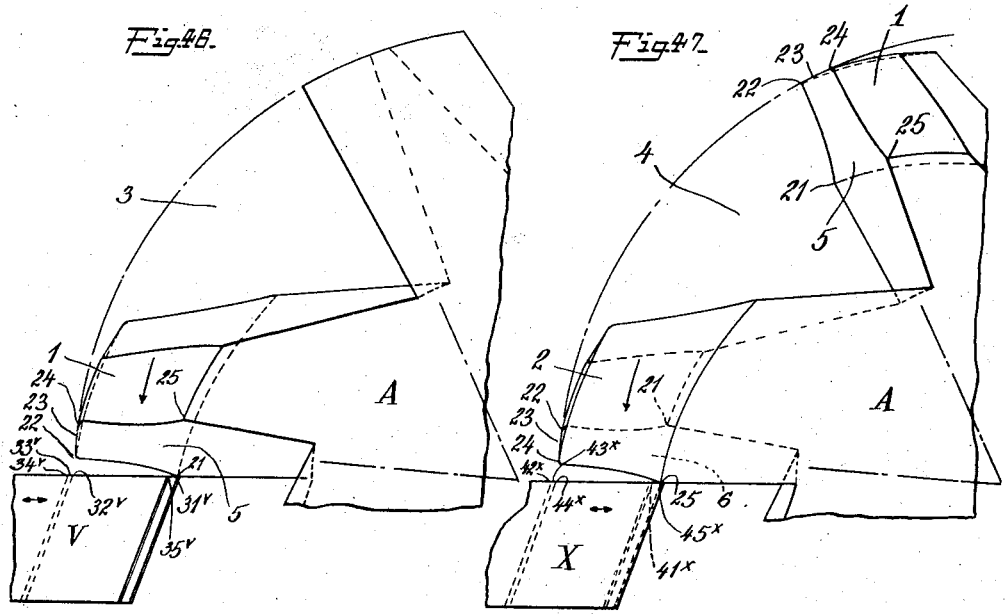
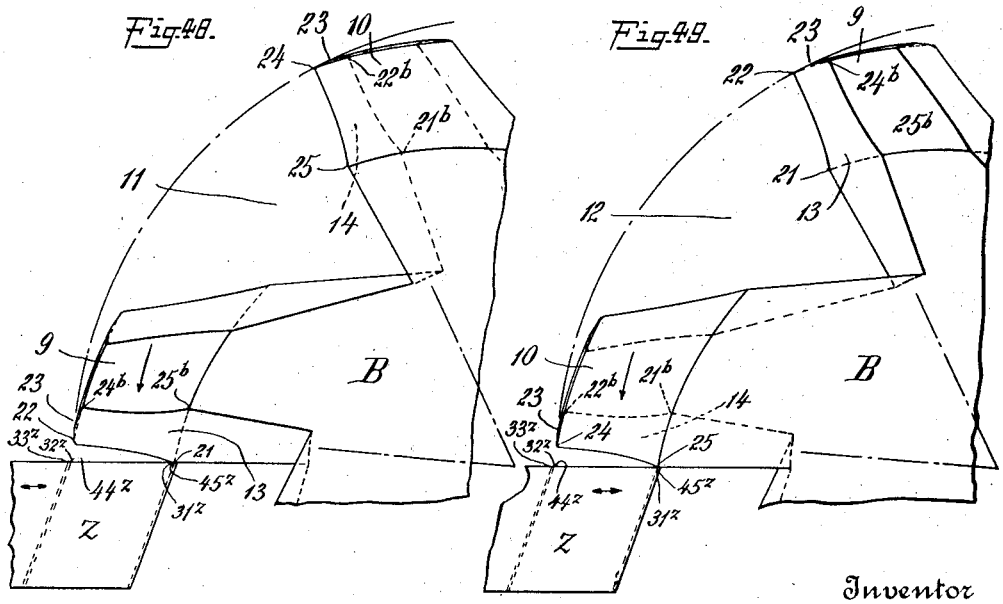
Inventor
Friederich Müller
By
S. Jay Teller
Attorney

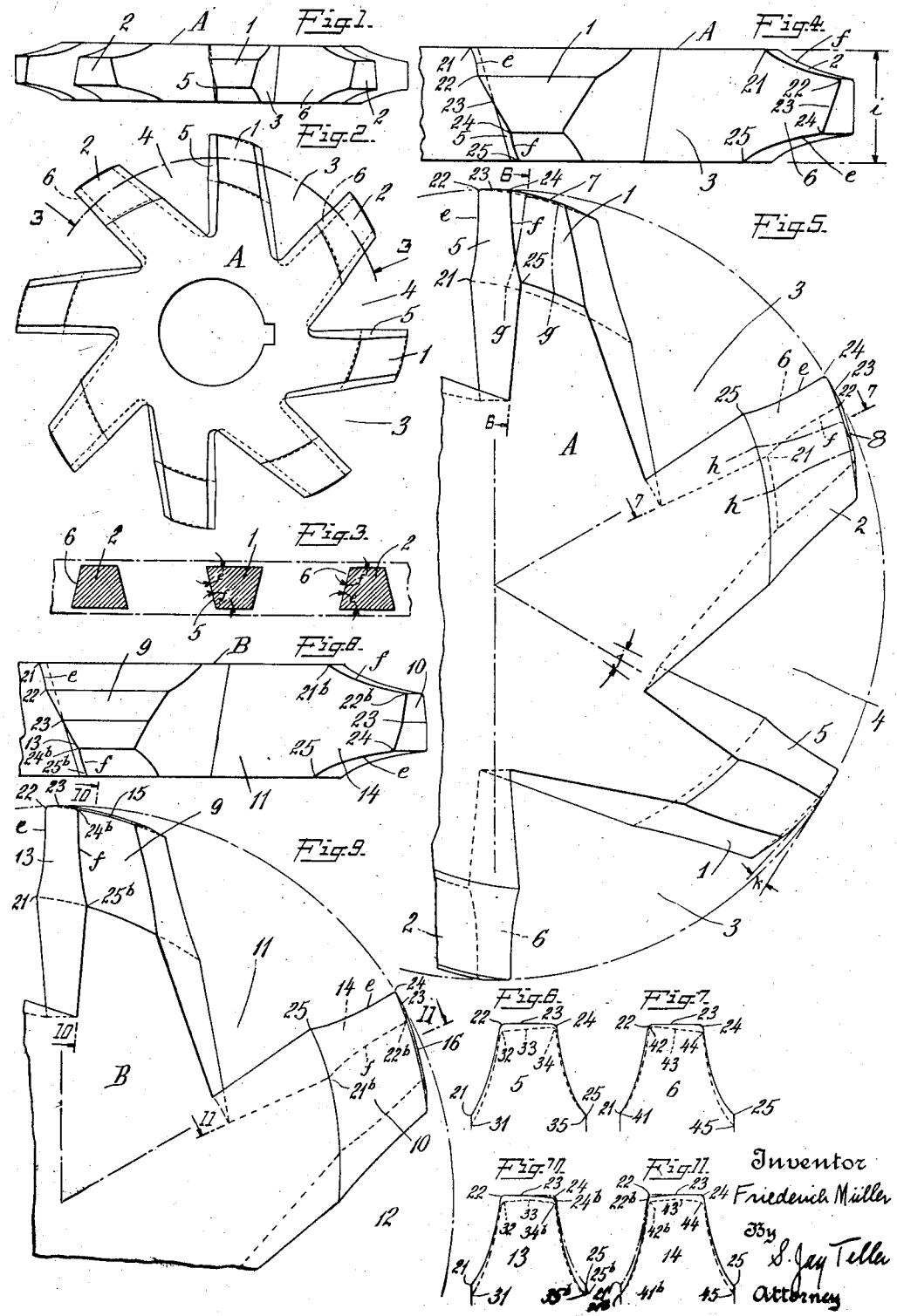

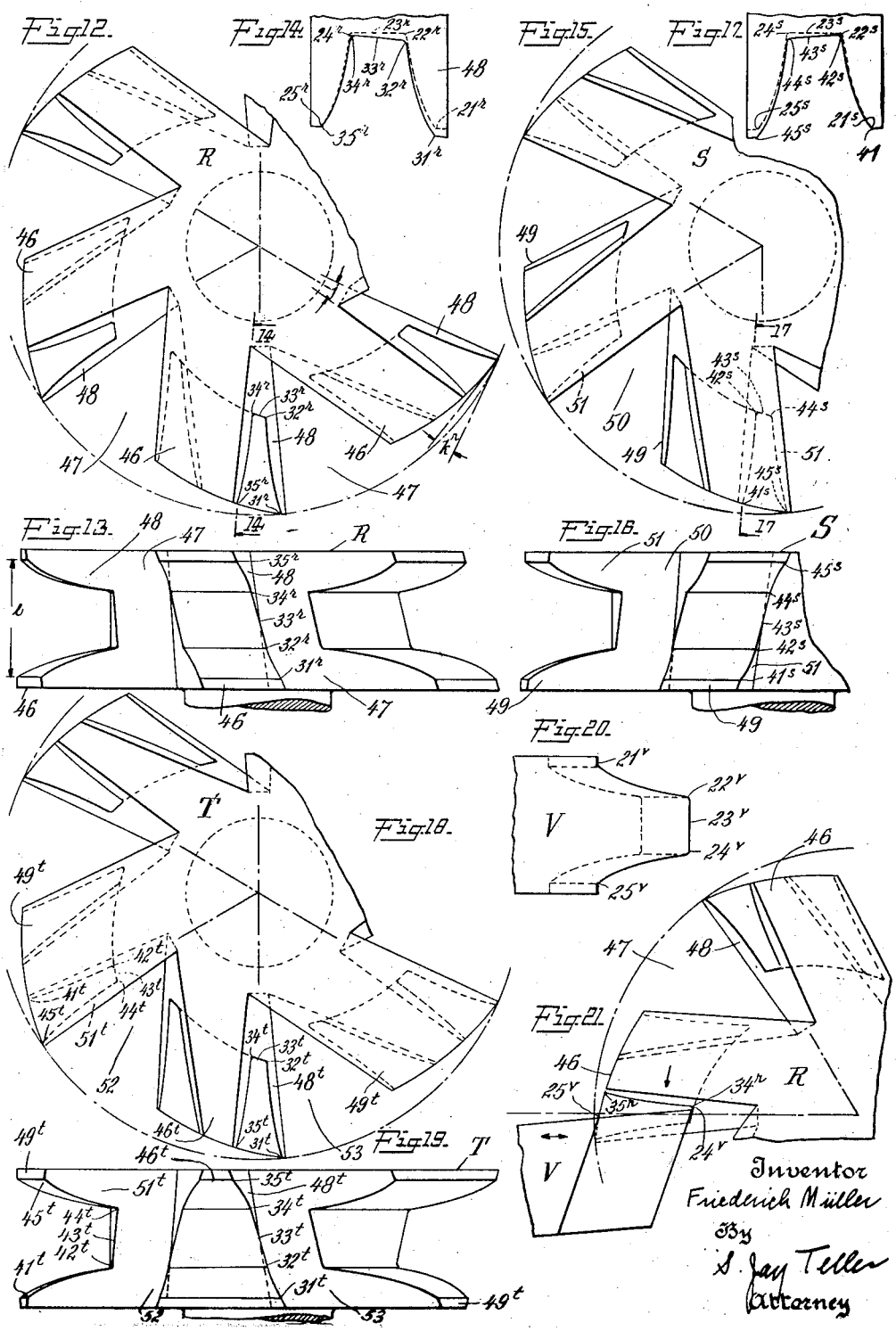

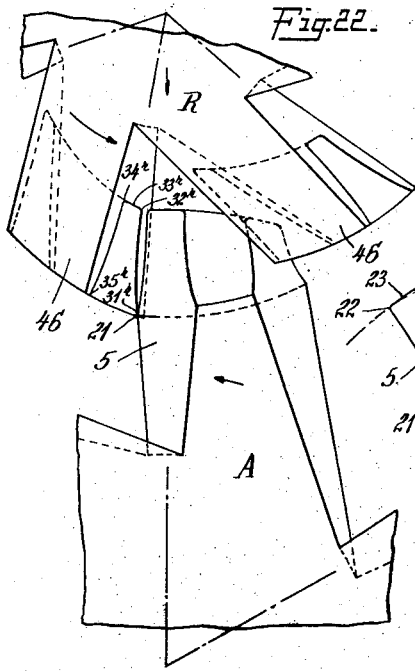
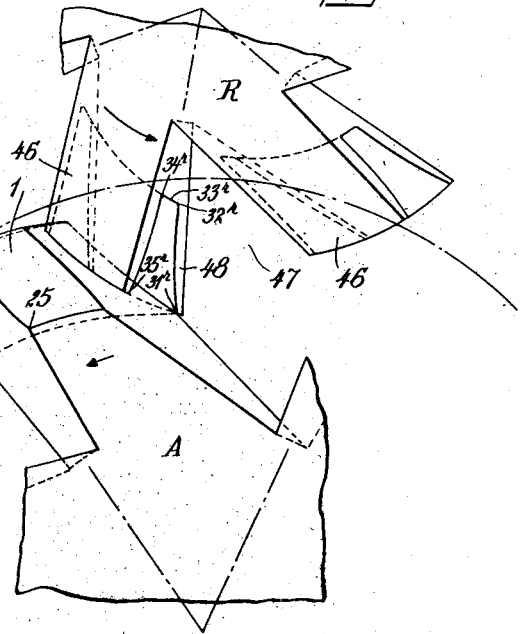
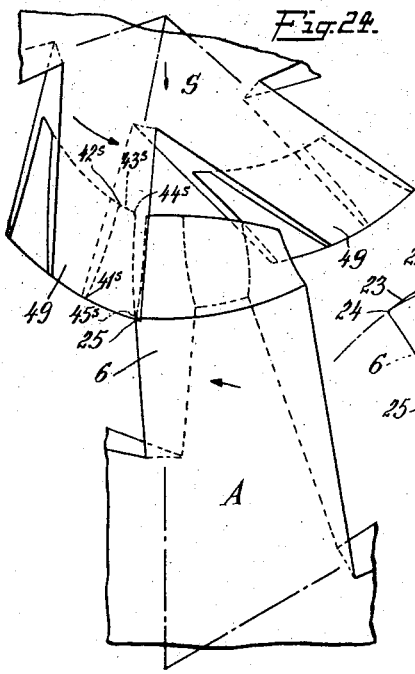
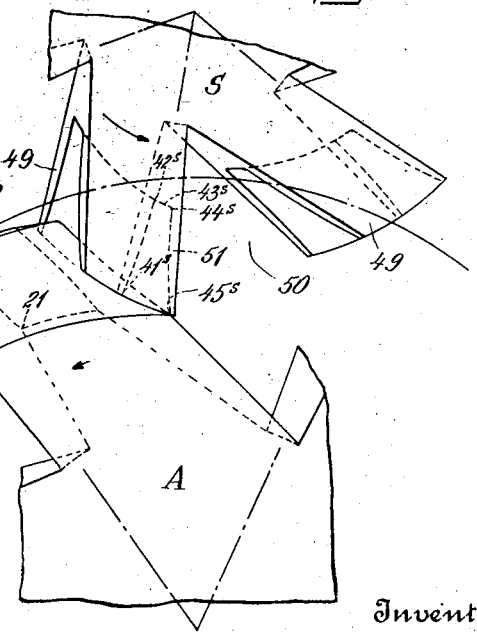

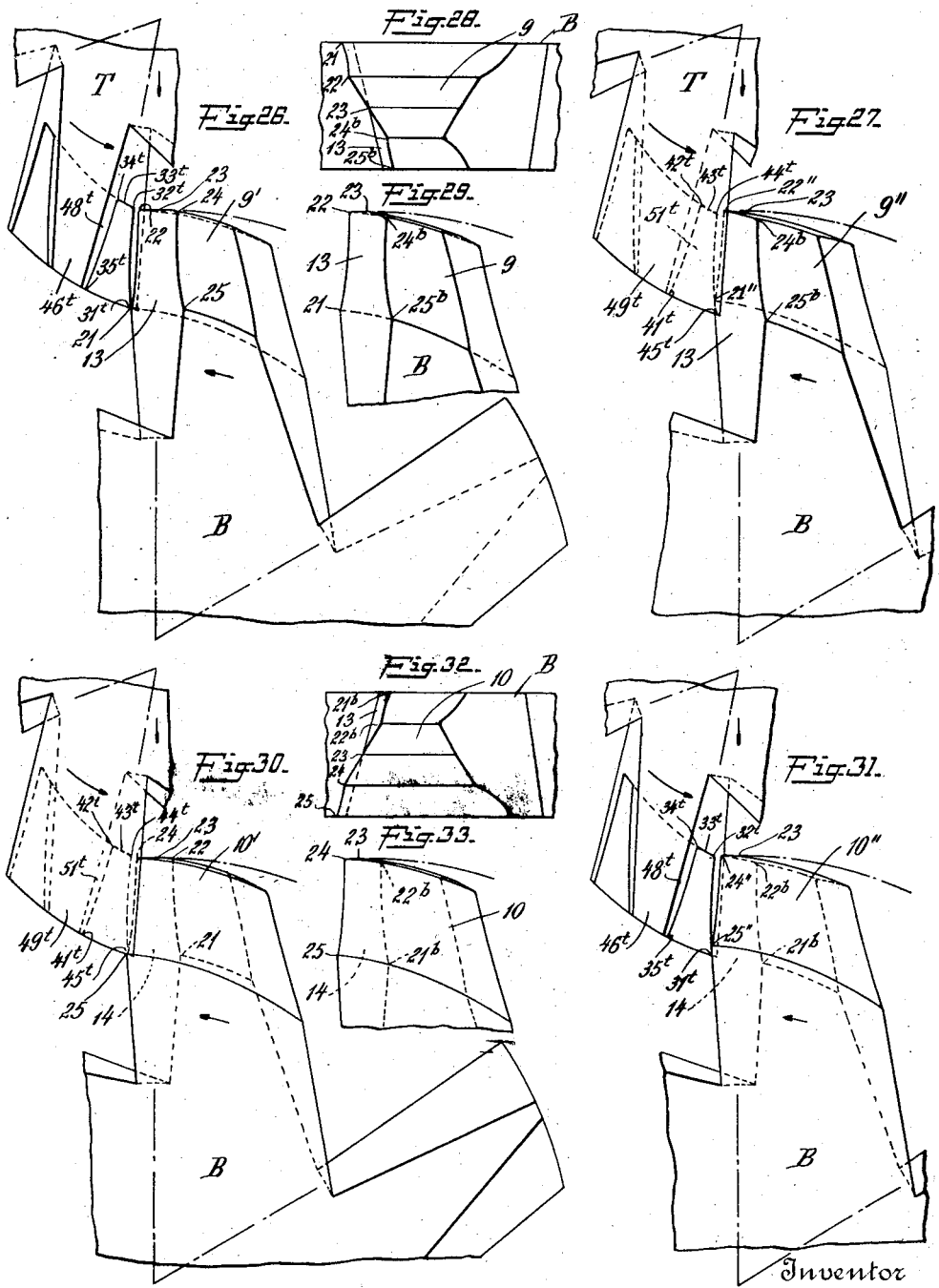

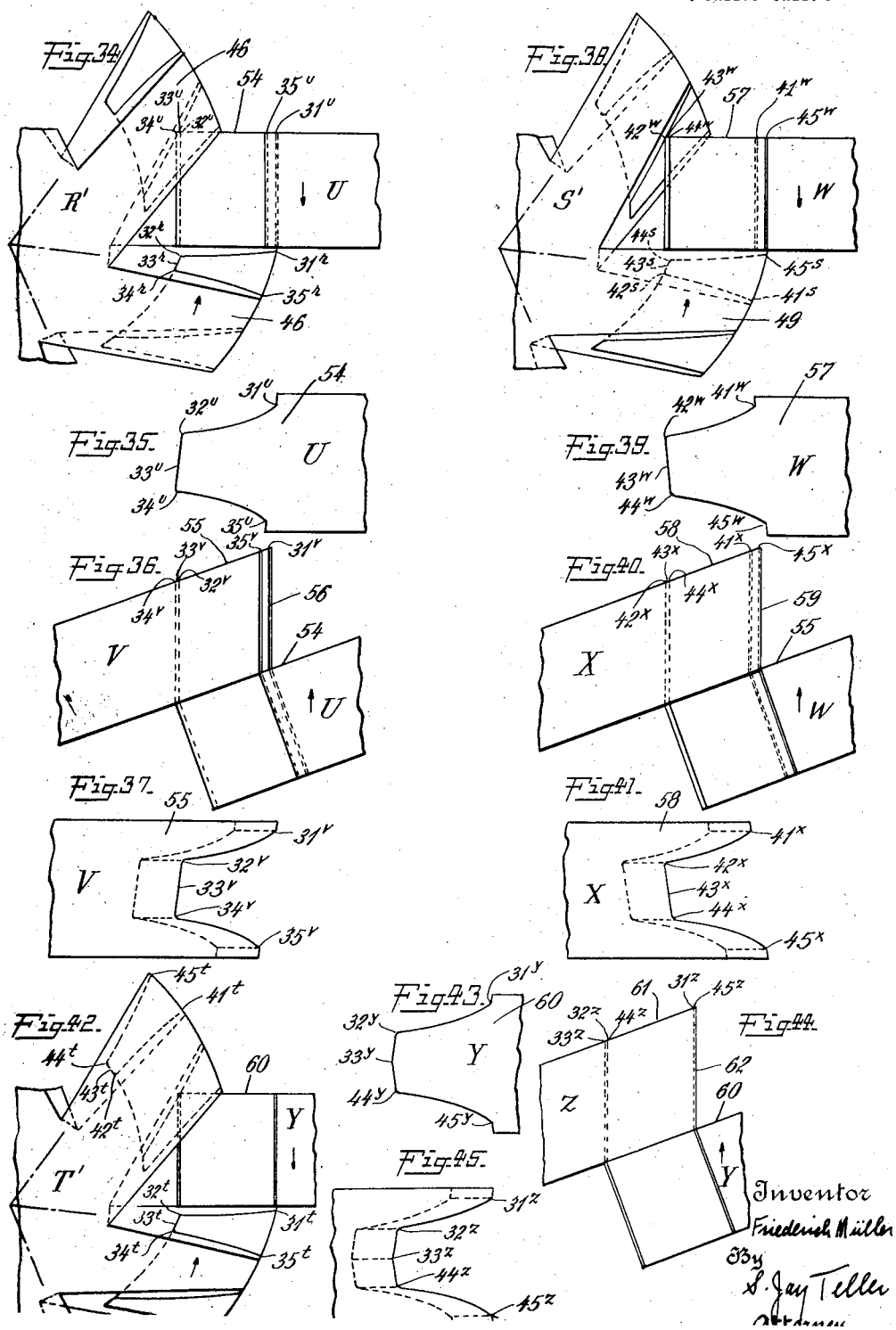

UNITED STATES PATENT OFFICE.

FRIEDERICH MÜLLER, OF HARTFORD, CONNECTICUT, ASSIGNOR TO PRATT & WHITNEY COMPANY, OF NEW YORK, N. Y., A CORPORATION OF NEW JERSEY.

METHOD OF MAKING MILLING-CUTTERS.

1,348,308.

Specification of Letters Patent.

Patented Aug. 3, 1920.

Application filed March 31, 1919. Serial No. 286,522.

*To all whom it may concern:*

Be it known that I, FRIEDERICH MÜLLER, a citizen of the United States, residing at Hartford, in the county of Hartford and State of Connecticut, have invented certain new and useful Improvements in Methods of Making Milling-Cutters, of which the following is a specification.

It is a well known principle in the art of cutting metals that the cutting edge of the tool should preferably be inclined with respect to the direction of relative movement so as to effect a shearing cut. This inclination is of advantage in that it improves the cutting action and it is also of advantage in that it permits the tool to engage the work gradually and with relatively little shock instead of engaging it suddenly with greater shock. This principle has been applied to relieved milling cutters which are of uniform diameter throughout and has also been applied to milling cutters having a uniform taper from one end to the other. These milling cutters have their cutting edges longitudinally inclined with respect to the axis, the cutting edge usually approximately conforming to a helix. Thus each tooth is enabled to engage the work gradually and to effect a shearing cut.

I have applied this principle to accurately make and properly relieved formed or contour cutters. By a formed or contour cutter I mean one in which the diameter varies from end to end in ways differing from a uniform taper, the cutter being thus adapted to cut a predetermined contour other than a straight line. Prior to my invention it had not been deemed practical or possible to make such cutters with inclined cutting faces. The said invention is presented and claimed in my copending application for milling cutters, Serial No. 268,349, filed December 26th, 1918.

In my copending application for milling cutters, Serial No. 286,521, filed on even date herewith, I have presented a milling cutter embodying the invention set forth in my said application, Serial No. 268,349, but having certain additional features of improvement adapting it for special kinds of work. With a cutter such as a gear cutter having a very deep contour, the advantages arising from the inclination of the cutting faces in accordance with my invention set forth in application, Serial No. 268,349, may be partly offset by the fact that, while the cutting edges at one side are formed at acute angles, those at the other side are formed at obtuse angles. These latter cutting edges not only fail to cut easily but tend to crowd the cutter bodily toward the other side. In accordance with the invention set forth in application Serial No. 286,521, I provide the cutter with cutting faces which are inclined oppositely, the cutting faces inclined in one direction preferably being arranged alternately with respect to those inclined in the opposite direction. Also in accordance with the said invention the cutter is so formed that each tooth is effective for cutting only at the acute-angled side thereof and is ineffective for cutting at the obtuse-angled side thereof.

The object of the present invention is to provide a method of making milling cutters embodying the invention set forth in my said application Serial No. 286,521.

As to a part of its subject matter the present application constitutes a continuation of my abandoned application for milling cutters and methods of making, Serial No. 237,705 filed June 1st, 1918.

In the accompanying drawings I have shown two different cutters, and I have illustrated two forms of method which may be used for making the cutters. It will be understood, however, that the drawings are intended to be merely illustrative and are not to be construed as defining or limiting the scope of the invention, the accompanying claims being relied upon for that purpose. Particularly it will be understood that there can be wide variation in the contours of the cutters, the contours shown being merely selected as typical.

Of the drawings:

Figures 1 and 2 are plan and side views respectively of a milling cutter embodying the invention. A gear cutter has been selected for purposes of illustration.

Fig. 3 is a fragmentary developed sectional view taken along the arcuate line 3—3 of Fig. 2.

Figs. 4 and 5 are fragmentary diagrammatic plan and side views respectively, on an enlarged scale, of the cutter shown in Figs. 1 and 2. In these views the cutter is shown with a smaller number of teeth, and the angles of inclination of the cutting faces of the teeth are increased, in order to bring out the principles of the invention more clearly.

Figs. 6 and 7 are diagrammatic views illustrating certain features of the cutter shown in Figs. 4 and 5.

Figs. 8 and 9 are fragmentary diagrammatic views, similar respectively to Figs. 4 and 5, illustrating a cutter similar to that shown in the said figures but differing therefrom in certain respects.

Figs. 10 and 11 are diagrammatic views illustrating certain features of the cutter shown in Figs. 8 and 9.

Figs. 12 and 13 are fragmentary side and bottom views respectively of a preliminary milling cutter adapted to be used in making the final cutter shown in Figs. 4 and 5.

Fig. 14 is a diagrammatic view illustrating certain features of the preliminary cutter shown in Figs. 12 and 13.

Figs. 15 and 16 are fragmentary side and bottom views respectively of another preliminary milling cutter adapted to be used in making the final cutter shown in Figs. 4 and 5.

Fig. 17 is a diagrammatic view illustrating certain features of the preliminary cutter shown in Figs. 15 and 16.

Figs. 18 and 19 are fragmentary side and bottom views respectively of a preliminary milling cutter adapted to be used in making the final cutter shown in Figs. 8 and 9.

Fig. 20 is a plan view of a lathe tool adapted to be used for shaping the preliminary milling cutters.

Fig. 21 is a diagrammatic view illustrating a method of shaping a preliminary milling cutter, use being made of the lathe tool shown in Fig. 20.

Fig. 22 is a diagrammatic view illustrating the preliminary cutter shown in Figs. 12 and 13 in use for milling a tooth of a blank for the final cutter shown in Figs. 4 and 5, the milling operation having been started but not finished.

Fig. 23 is a view similar to Fig. 22 but illustrating the tooth completely milled.

Fig. 24 is a view similar to Fig. 22 illustrating the preliminary cutter shown in Figs. 15 and 16 in use for milling another tooth of the blank for the final cutter shown in Figs. 4 and 5, the milling operation having been started but not finished.

Fig. 25 is a view similar to Fig. 24 but illustrating the tooth completely milled.

Figs. 26 and 27 are diagrammatic views illustrating the preliminary cutter shown in Figs. 18 and 19 in use for milling a tooth of the blank for the final cutter shown in Figs. 8 and 9.

Figs. 28 and 29 are plan and side views respectively of a single tooth formed by the method step illustrated in Figs. 26 and 27.

Figs. 30 and 31 are views similar respectively to Figs. 26 and 27 illustrating the preliminary cutter shown in Figs. 18 and 19 in use for milling another tooth of the blank for the final cutter shown in Figs. 8 and 9.

Figs. 32 and 33 are plan and side views respectively of a single tooth made by the method step illustrated in Figs. 30 and 31.

Figs. 34 and 35 are side and plan views respectively of an intermediate tool which may be used for making a lathe tool adapted to be used for cutting the final cutter, as shown in Figs. 4 and 5. Fig. 34 illustrates a milling cutter such as shown in Figs. 12 and 13 in operative relation to the tool.

Fig. 36 illustrates the intermediate tool shown in Figs. 34 and 35 in use for making the lathe tool.

Fig. 37 is a plan view of the lathe tool.

Figs. 38 and 39 are side and plan views respectively of another intermediate tool which may be used for making another lathe tool adapted to be used for cutting a final cutter such as shown in Figs. 4 and 5. Fig. 38 illustrates a milling cutter such as shown in Figs. 15 and 16 in operative relation to the tool.

Fig. 40 illustrates the intermediate tool shown in Figs. 38 and 39 in use for making the lathe tool.

Fig. 41 is a plan view of the lathe tool.

Figs. 42 and 43 are side and plan views respectively of an intermediate tool which may be used for making a lathe tool adapted to be used for cutting a final cutter such as shown in Figs. 8 and 9. Fig. 42 illustrates a milling cutter such as shown in Figs. 18 and 19 in operative relation to the tool.

Fig. 44 illustrates the intermediate tool shown in Figs. 42 and 43 in use for making the lathe tool.

Fig. 45 is a plan view of the lathe tool.

Figs. 46 and 47 are views illustrating the lathe tools shown in Figs. 36 and 37 and in Figs. 40 and 41 respectively, in use for cutting a final cutter such as shown in Figs. 4 and 5.

Figs. 48 and 49 are views illustrating the lathe tool shown in Figs. 44 and 45 in use for cutting a final cutter such as shown in Figs. 8 and 9.

In order that the methods may be clearly understood I have shown in the accompanying drawings two different cutters embodying the invention set forth in the aforesaid application Serial No. 286,521. Referring to the drawings, particularly to Figs. 1 to 5 thereof it will be seen that I have shown a cutter A embodying the invention, a gear cutter having been selected by way of example. The cutter A is provided with two sets of generally longitudinal teeth 1 and 2 with grooves 3 and 4 between them. The teeth and grooves are preferably spaced uniformly, or approximately so. The grooves can be of any usual or preferred depth and shape, as required by the spacing and by the depth of the contour. The front walls 5 and 6 of the teeth 1 and 2 respectively constitute cutting faces and these cutting faces are radial or approximately so in order to provide a satisfactory cutting angle. In accordance with the invention, the cutting faces 5 and 6 are inclined or positioned obliquely so that the longitudinal lines of each of them lie at angles to the axis of the cutter. The cutting faces 5 of the teeth 1 are inclined in one direction and the cutting faces 6 of the teeth 2 are inclined in the other direction. By preference the teeth 1 and 2 with the respective cutting faces 5 and 6 oppositely inclined are alternated with each other, as clearly shown in the drawings. Preferably the entire grooves 3 and 4 are oblique or inclined the rear wall of each tooth being inclined in the same direction as the front wall of the next following tooth and in the opposite direction from its own front wall. Each cutting face preferably conforms to a helicoid, and as illustrated each helicoid is one formed by a generatrix following the axis of the cutter and also following a helix on a cylinder concentric with the axis thereof, the helicoid in this case being radial. The helicoids for the different cutting faces 5 and 6 are oppositely inclined but preferably the degrees of inclination and the longitudinal pitches are the same.

The cutter may be made for cutting any desired practical contour. The contour illustrated is that of the space between two teeth of a spur gear, and the invention is particularly applicable to a cutter, such as a gear cutter, having a contour which is symmetrical or approximately so.

With a cutter such as shown having a deep convex contour, it is obvious that a large part of the cutting will be effected at the sides of the teeth. The cutting angles at the sides of the teeth are therefore important. Fig. 3 is a developed fragmentary sectional view of the cutter A, the direction of movement during operation being indicated by the arrow. This view shows more clearly the inclination of the grooves 3 and 4, and of the cutting faces 5 and 6. It will be seen that a tooth 1 behind one of the grooves 3 has at one side, in this case the foremost side, an angle $e$ which is acute and well adapted for cutting. The same tooth 1 has at the other side, in this case the rearmost side, an angle $f$ which is obtuse and not well adapted for cutting. It will therefore be seen that, if all the teeth were the same, one side of the cutter, that is the side having the angles $e$, would be much better for cutting than the other side having the angles $f$. The $f$ side would not only cut poorly but would tend to force the cutter endwise toward the $e$ side. These disadvantages are overcome by the oppositely formed teeth 2 each of which has an angle $e$ and an angle $f$ on the sides opposite respectively to the angles $e$ and the angles $f$ of the teeth 1. As before stated, the respective teeth 1 and 2 are preferably alternately arranged.

It will be noted that the foregoing discussion as to the angles $e$ and $f$ is wholly applicable only to a cutter having a convex contour. For a cutter having a concave contour the acute-angled side of each tooth is to the rear of the obtuse-angled side instead of in advance thereof, and the invention is therefore less advantageous as applied to such a cutter.

The outer edge of each cutting face has an outline which is shaped to cut either all or at least a part of the predetermined contour when the cutter is rotated, this outline of the cutting face following the helicoidal surface thereof. Each cutting face 5 or 6 of the cutter A has an outline such that each tooth will cut the entire predetermined contour, as shown by full lines in Figs. 6 and 7. This outline includes the points 21, 22, 23, 24 and 25. All points along the outline are at their respective correct distances from the center so that when the cutter is rotated they will define the correct predetermined contour. This relationship of the several points along the outline of the cutting face obtains notwithstanding the fact that the cutting face is a warped or helicoidal surface.

Each tooth 1 or 2 of the cutter is relieved along lines 7 or 8 extending backward and inward from the outline of the cutting face, these relief lines forming a continuous surface or continuous surfaces which extend from end to end of the cutter and which are properly constructed notwithstanding the variations in radius at different points along the said outline and notwithstanding the variations in angular position resulting from the warped or helicoidal cutting face. Preferably the relief lines 7 or 8 of each tooth are maintained in similar relationship to each other as they extend backward and inward, the lines preferably conforming to spirals of Archimedes.

As the result of the spiral relief each tooth 1 at any axial plane of intersection, such as 6—6, has a distorted shape, as shown by dotted lines in Fig. 6. This distorted shape includes points 31, 32, 33, 34 and 35 corresponding respectively to the points 21, 22, 23, 24 and 25 on the outline of the cutting face 5. The distortion of shape results from the fact that the successive inward inclined relief lines 7 start at different angular positions because of the inclined or helicoidal cutting face. Therefore with the cutting face 5 inclined in the direction shown the several points 34, 33, 32 and 31 to the left of the point 25 or 35 are spaced inward from the respective points 24, 23, 22 and 21 by progressively increasing distances. Notwithstanding this distortion in shape at an axial plane of intersection, the outline or effective contour at the cutting face 5 is correct, as before stated. Similarly each tooth 2, at any axial plane of intersection, such as 7—7, has a distorted shape as shown by dotted lines in Fig. 7. This distorted shape includes points 41, 42, 43, 44 and 45 corresponding respectively to the points 21, 22, 23, 24 and 25 on the outline of the cutting face 6. With the cutting face 6 inclined in the direction shown the several points 42, 43, 44 and 45 to the right of the point 21 or 41 are spaced inward from the respective points 22, 23, 24 and 25 by progressively increasing distances. Notwithstanding this distortion in shape at an axial plane of intersection, the outline or effective contour at the cutting face 6 is correct, as before stated. Inasmuch as all of the teeth have an effective contour, which is the same as the predetermined contour, the cutter will cut the said predetermined contour when used.

When the relief lines 7 and 8 conform to spirals and are maintained in similar relationship as they extend backward and inward, as is preferred, it is possible to sharpen or grind the teeth of the cutter on the front cutting faces 5 and 6 without changing the effective contour. The teeth present the same effective contour at successive inclined surfaces of intersection similar in form and position to the initial cutting faces. At any surface, such as $g$—$g$, back of the initial cutting face 5 of a tooth 1 and similar to the said face, the same effective contour will be found. Similarly at any surface, such as $h$—$h$ back of the initial cutting face 6 of a tooth 2 and similar to the said face, the same effective contour will be found. Therefore if the cutter is ground on the front faces to helicoids which are the same as the helicoids of the initial cutting faces the effective contour will remain the same.

It is obvious that with a cutter constructed as shown and described each tooth will be most effective for cutting at its acute-angled side, in this case the front or foremost side. The rear obtuse-angled side will be relatively ineffective for cutting. In order that the obtuse-angled sides may not interfere with the cutting action and reduce the efficiency thereof, it is sometimes preferable to provide a cutter such as B shown in Figs. 8 and 9 having teeth 9 and 10 which are so shaped that each of them is capable of cutting only at the acute-angled side, the obtuse-angled side being reduced so as to provide a clearance.

The teeth 9 and 10 of the cutter B are separated by grooves 11 and 12 and the teeth are provided respectively with cutting faces 13 and 14 similar respectively to the faces 5 and 6 of the cutter A. The teeth are relieved respectively along spiral lines 15 and 16. The cutter B is or may be similar to the cutter A except as hereinafter described. As shown by full lines in Fig. 10, the cutting face 13 of each tooth 9 has at its left acute-angled or foremost side an outline 21, 22, 23 such that the tooth will cut at least the left half of the predetermined contour 21, 22, 23, 24, 25. The right obtuse-angled or rearmost side has an outline which is slightly reduced below the desired contour, the amount of reduction gradually increasing from the center toward the right. The reduced outline at the right is indicated by 23, $24^b$, $25^b$. As shown by full lines in Fig. 11 the cutting face 14 of each tooth 10 has at its right acute-angled or foremost side an outline 23, 24, 25 such that the tooth will cut at least the right half of the predetermined contour 21, 22, 23, 24, 25. The left obtuse-angled or rearmost side has an outline which is slightly reduced below the desired contour, the amount of reduction gradually increasing from the center toward the left. The reduced outline at the left is indicated by 23, $22^b$, 21.

Each tooth 9 at any axial plane of intersection, such as 10—10, has a distorted shape 31, 32, 33, $34^b$ and $35^b$, as shown by dotted lines in Fig. 10. The shape 31, 32, 33 at the left is the same as the left half of the shape 31, 32, 33, 34, 35 of a tooth 1 of the cutter A as shown in Fig. 6, but the shape 33, $34^b$, 35 at the right is reduced below the said shape 31, 32, 33, 34, 35, the amount of reduction gradually increasing from the center toward the right. Each tooth 10 at any axial plane of intersection, such as 11—11, has a distorted shape $41^b$, $42^b$, 43, 44 and 45, as shown by dotted lines in Fig. 11. The shape 43, 44, 45 at the right is the same as the right half of the shape 21, 22, 23, 24, 25 of a tooth 2 of the cutter A as shown in Fig. 7, but the shape 43, $42^b$ and 41 at the left is reduced below the said shape 41, 42, 43, 44, 45, the amount of reduction gradually increasing from the center toward the left. Inasmuch as each alternate tooth has an effective contour which is the same as one-half of the predetermined contour and each other tooth has an effective contour which is the same as the other half of the predetermined contour, the cutter has a composite contour which is the same as the predetermined contour and it will cut the said contour when used. The cutter B, like the cutter A, can be sharpened or ground on the front cutting faces 13 and 14 without changing the effective contour.

Taking up now the method of making the improved milling cutter, it will be understood that the preliminary steps of turning the blank, cutting the grooves therein, etc., can be carried on in any usual or preferred way, these not of themselves constituting any part of the present invention. The invention relates particularly to the method of shaping the blank to provide the right-hand and left-hand teeth with distorted contours which will cut a correct contour.

The method is in many respects similar to that set forth in my copending application for methods of making milling cutters, Serial No. 268,350, filed December 26th, 1918, Reference may be had to the said application for detailed description of certain phases of the method and of certain possible variations thereof.

In practising the method there is provided a preliminary cutting means which may be either one or two preliminary cutters adapted to be used to form the shape of the final milling cutter. Preferably the preliminary cutters are milling cutters and they will be so described. For making the cutter A use is made of two milling cutters R and S, shown respectively in Figs. 12 to 14 and 15 to 17. For making the cutter B use is preferably made of a single milling cutter T shown in Figs. 18 and 19.

The cutter R is provided with generally longitudinal teeth 46 which are separated by grooves 47 and which have front cutting faces 48. Each tooth of the preliminary cutter R has at any axial plane of intersection such as 14—14 a shape which is the same or approximately the same as the predetermined contour, as shown by dotted lines in Fig. 14. While the contour is the same, it is reversely positioned with respect to the axis, the points which are outermost on the final cutter being innermost on the preliminary cutter and vice versa. The points along this plane of intersection are indicated by $21^r$, $22^r$, $23^r$, $24^r$ and $25^r$ these corresponding respectively to the points 21, 22, 23, 24 and 25 on the effective contour of the final cutter A.

The front cutting faces 48 of the teeth 46 of the cutter R are helicoidal in form and have the same longitudinal pitch or lead as the helicoidal faces 5 of the teeth 1 of the cutter A. The cutting faces 48 and the cutting faces 5 are inclined in the same direction. The preliminary cutter R is preferably much smaller in diameter than the final cutter, and therefore there is an apparent difference in the helicoidal surfaces of the two cutters. While the helicoids are in reality the same, being determined by the same or similar directrices, the actual angle of inclination is less for the preliminary cutter R than for the final cutter A because of the smaller diameter. The actual angle of inclination of the cutting faces of the preliminary cutter is immaterial, and therefore the diameter of the preliminary cutter R can be varied as desired without interfering with the practice of the method. For the cutter A as illustrated in Figs. 6 and 7 the length $i$ of the cutter may be taken as the unit of length, and it will be seen that the corresponding angular advance is represented by $j$. For the cutter R as illustrated in Figs. 12 and 13 the same unit of length $i$ is taken, and the angular advance $j$ is kept the same.

Each tooth 46 of the preliminary cutter R has a degree of relief which is the same as the degree of relief of the teeth of the final cutter. The "degree of relief" in each case is represented by the ratio between the angular advance of the cutter and the decrease in diameter. The decrease in diameter for each angular increment of advance of the cutter R is the same as the decrease in diameter for each angular increment of advance of the cutter A. While the degrees of relief are the same for both cutters, their is an apparent difference because of the smaller diameter of the cutter R. This causes the relief lines to meet the circumferential lines at a relatively small angle such as $k$ for the cutter A and at a relatively large angle such as $k^r$ for the cutter R, but it will be remembered that the degrees of relief are the same, as before explained.

As the result of providing the teeth of the preliminary cutter R with the same helicoidal cutting faces and with the same degree of relief as the teeth 1 of the final cutter A, the front outline or effective contour of each tooth is distorted, as shown by full lines in Fig. 14. The points $31^r$, $32^r$, $33^r$, $34^r$ and $35^r$ along the distorted outline correspond respectively to the points $21^r$, $22^r$, $23^r$, $24^r$ and $25^r$ along the shape at an axial plane of intersection. The several points $34^r$, $33^r$, $32^r$ and $31^r$ to the right of the point $25^r$ or $35^r$ are spaced outward from the respective points $34^r$, $33^r$, $32^r$ and $31^r$ by progressively increasing distances. The actual inclination of each cutting face is less by reason of the smaller diameter but the amount of relief is more for the same reason, and these differences exactly compensate for each other. The result is that the distortion of the outlines $31^r$, $32^r$, $33^r$, $34^r$, $35^r$ of the teeth of the cutter R is exactly the reverse of the desired distortion 31, 32, 33, 34, 35 of the teeth 1 of the final cutter A along axial planes of intersection, the two distortions being exactly the same in extent.

The cutter S has teeth 49 with grooves 50 between them, the teeth being provided with helicoidal cutting faces 51. The cutter S is exactly like the cutter R except that the cutting faces 51 are inclined in the direction opposite to that of the cutting faces 48. Each tooth of the preliminary cutter S has at any axial plane of intersection such as 17—17 a shape which is the same or approximately the same as the predetermined contour, as shown by dotted lines in Fig. 17, and also the same as the shape $21^r$, $22^r$, $23^r$, $24^r$, $25^r$ of the tooth of the cutter R. The points along this plane are indicated by $21^s$, $22^s$, $23^s$, $24^s$ and $25^s$. The distorted front outline or effective contour of each tooth is $41^s$, $42^s$, $43^s$, $44^s$ and $45^s$, the several points $44^s$, $43^s$, $42^s$ and $41^s$ to the left of the point $25^s$ or $45^s$ being spaced outward from the respective points $24^s$, $23^s$, $22^s$ and $21^s$ by progressively increasing distances. The distortion of the outlines $41^s$, $42^s$, $43^s$, $44^s$, $45^s$ of the teeth of the cutter S is exactly the reverse of the desired distortion 41, 42, 43, 44, 45 of the teeth 2 of the final cutter A along axial planes of intersection, the two distortions being exactly the same in extent.

The cutter T has differing teeth $46^t$ and $49^t$ with grooves 52 and 53 between them, the teeth being provided respectively with helicoidal cutting faces $48^t$ and $51^t$. Each tooth $46^t$ is similar to a tooth 46 of the cutter R, and each tooth $49^t$ is similar to a tooth 49 of the cutter S. Each tooth $46^t$ has a distorted front outline or effective contour $31^t$, $32^t$, $33^t$, $34^t$ and $35^t$ which is the same as the contour $31^r$, $32^r$, $33^r$, $34^r$, $35^r$ of the cutter R. Each tooth $49^t$ has a distorted front outline or effective contour $41^t$, $42^t$, $43^t$, $44^t$ and $45^t$ which is the same as the contour $41^s$, $42^s$, $43^s$, $44^s$, $45^s$ of the cutter S.

Any of the preliminary cutters R, S or T can most conveniently be made by means of a lathe tooth such as V, shown in Figs. 20 and 21, this tool being used in a relieving lathe. The lathe tool V is formed with a contour $21^v$, $22^v$, $23^v$, $24^v$ and $25^v$ on its top cutting face which is the same as the effective contour of the teeth of the final cutter A. Fig. 21 shows the cutter R being formed, it being understood that it is rotated in the direction of the arrow and that the tool V is moved in and out, as indicated by the horizontal arrow, so as to follow the proper relief. The operation is exactly the same for the cutter S or the cutter T. In the case of each cutter all of the teeth can be made in the one operation as they have the same cross-sectional shape. In order to make a small correction, as explained in detail in my aforesaid application, Serial No. 268,350, it is sometimes desirable to set the tool V with the top cutting face in a plane at an angle to a plane through the axis of the preliminary cutter, as indicated in Fig. 21.

In making the cutter A both of the cutters R and S are used, as shown in Figs. 22 to 25. Either cutter may be used first and I will first describe the use of the cutter R.

Figs. 22 and 23 show the preliminary cutter R in use for milling the teeth 1 of the final cutter A. It will be understood that the cutter R is rapidly rotating in the direction indicated by the arrow thereon; that the blank A is slowly rotating in the direction indicated by the arrow thereon; and that relative approaching and receding movements are effected between the cutter and the blank in timed relation to the blank rotation to provide the required relief on the final cutter. These relieving movements are preferably effected by moving the axis of the cutter bodily toward the axis of the blank, as indicated by the vertical arrow, and then bodily away from the axis of the blank in the opposite direction. Preferably the downward or inward relieving movement is so timed that the resulting relief on the blank will conform to spirals of Archimedes. The cutter R is moved slowly downward during the cutting of each tooth 1 and then is rapidly moved upward between the teeth to position it for the cutting of the next tooth 1. The timing of the relieving movements is such that the teeth 2 are not engaged.

As shown in Fig. 22, the cutter R and the blank A have been so adjusted that the teeth 46 of the rotating cutter D will mill the initial point 21 of the tooth 1 of the blank A to the required distance from the axis. The downward movement of the cutter R in timed relation to the slow rotation of the blank A causes it to take a cut which gradually increases in depth at the successive points 22, 23, 24 and 25 back of the point 21. This action is continued till the relative position shown in Fig. 23 is reached. In this milling action the distorted shape of the cutter R causes the desired distortion in the shape of the teeth 1 of the cutter A. The cutter R shapes the teeth 1 with the several points 21, 22, 23, 24 and 25 all at the proper distances from the axis, so that these teeth when used will cut the true predetermined contour, as shown by full lines in Fig. 6.

The action of the cutter S as shown in Figs. 24 and 25 is exactly the same as that of the cutter R except that the teeth 2 are engaged instead of the teeth 1. The distorted shape of the cutter S causes the desired distortion in the shape of the teeth 2 of the cutter A. The cutter S shapes the teeth 2 with the several points 21, 22, 23, 24 and 25 all at the proper distances from the axis so that these teeth when used will cut the true predetermined contour, as shown by full lines in Fig. 7.

In making the cutter B both cutters R and S may be used, the operation being the same as that shown in Figs. 22 to 25, except that each preliminary cutter engages each tooth of the final cutter. Preferably, however, the cutter T is used, as shown in Figs. 26 to 33. The cutter T is shown in Fig. 26 with one of its teeth 46$^t$ engaging a tooth 9' of a cutter blank B. For the present let it be imagined that the cutter T has only the teeth 46$^t$, the teeth 49$^t$ being omitted. The cutter T is assumed to be rotating rapidly, as indicated, and the blank B is assumed to be rotating slowly in the opposite direction, as indicated. It is also assumed that relative approaching and receding movements are effected between the cutter and the blank in timed relation to the blank rotation to provide the required relief on the finished tooth. The action of the teeth 46$^t$ of the cutter T taken by themselves, is exactly the same as that of the cutter R, as shown in Figs. 22 and 23. The teeth 46$^t$ would mill the tooth 9' to the form shown, this tooth in transverse section having a distorted shape as indicated by dotted lines in Fig. 6, but nevertheless presenting an effective contour 21, 22, 23, 24, 25 at the cutting face which is correct for cutting the predetermined contour.

Fig. 27 is a view similar to Fig. 26 but showing the cutter T with one of its teeth 49$^t$ engaging a tooth 10'' of the cutter blank B. In considering this figure let it be imagined that the cutter T has only teeth 49$^t$, the teeth 46$^t$ being omitted. The teeth 49$^t$ of the cutter T, if acting by themselves, would mill the tooth 10'' to the form shown. Inasmuch as the cutting faces 51$^t$ of the teeth 49$^t$ are inclined oppositely to the faces 13 of the teeth 9'', the teeth 9'' are cut with a cross sectional shape which is distorted oppositely to the proper distortion that would be necessary for providing the correct effective contour at the cutting faces. The result is that the teeth 9'' have an abnormally distorted contour 21'', 22'', 23, 24$^b$, 25$^b$ at the cutting face, the part 21'', 22'', 23 being outside the correct contour 21, 22, 23 as shown in Fig. 6, and the part 23, 24$^b$, 25$^b$ being inside the correct contour 23, 24, 25 as shown in Fig. 6. The point 23 of this distorted contour coincides with the point 23 of the correct contour.

Inasmuch as the cutter T actually has both kinds of teeth 46$^t$ and 49$^t$ and inasmuch as these teeth follow each other in rapid succession, the tooth being milled, therefore, never has the entire form 9' shown in Fig. 26 nor the entire form 9'' shown in Fig. 27. The teeth 49$^t$ reduce the contour 23, 24, 25 which the teeth 46$^t$ tend to cut, and the teeth 46$^t$ reduce the contour 21'', 22'', 23 which the teeth 49$^t$ tend to cut. As the result of the composite action of the two sets of teeth 46$^t$ and 49$^t$ the teeth 9 are milled as shown in Figs. 28 and 29. Each tooth has the same contour 21, 22, 23 as the tooth 9' shown in Fig. 26, and has the same contour from 23, 24', 25' as the tooth 9'' shown in Fig. 27. The tooth 9 is effective at its right foremost side to cut the part 21, 22, 23 of the predetermined contour as shown in Fig. 6. The outline 23, 24$^b$, 25$^b$ of the cutting face is reduced and will not cut the predetermined contour.

Figs. 30 and 31 are views similar respectively to Figs. 26 and 27 and illustrate the separate actions of the teeth 49$^t$ and 46$^t$ in milling one of the teeth 2 of the final cutter A. The teeth 49$^t$, if acting by themselves, would mill the tooth 10' to the form shown, this tooth in transverse section having a distorted shape as indicated by dotted lines in Fig. 7, but nevertheless presenting an effective contour 21, 22, 23, 24, 25 at the cutting face 6, which is correct for cutting the predetermined contour. The teeth 46$^t$, if acting by themselves, would mill the tooth 10'' to the form shown. Inasmuch as the cutting faces 48$^t$ of the teeth 46$^t$ are inclined oppositely to the faces 14 of the teeth 10'', the teeth 10'' are cut with a cross sectional shape which is distorted oppositely to the proper distortion that would be necessary for providing the correct effective contour at the cutting faces. The result is that the teeth 10'' have an abnormally distorted contour 21$^b$, 22$^b$, 23, 24'', 25'' at the cutting face, the part 23, 24'', 25'' being outside the correct contour 23, 24, 25 as shown in Fig. 7 and the part 21$^b$, 22$^b$, 23 being inside the correct contour 21, 22, 23 as shown in Fig. 7. The point 23 of this distorted contour coincides with the point 23 of the correct contour. The tooth 10 cut by the composite action of the teeth 49$^t$ and 46$^t$ is shown in Figs. 32 and 33. Each tooth has the same contour 23, 24, 25 as the tooth 10' shown in Fig. 30, and has the same contour 21$^b$, 22$^b$, 23 as the tooth 10'' shown in Fig. 31. The tooth 10 is effective at its left foremost side to cut the part 23, 24, 25 of the predetermined contour, as shown in Fig. 7. The outline 21$^b$, 22$^b$, 23 of the cutting edge is reduced and will not cut the predetermined contour.

When the cutter B is used, as already stated, the teeth 1 and 2 follow each other in rapid succession, the teeth 1 cutting the part 21, 22, 23 of the contour and the teeth 2 cutting the part 23, 24, 25 of the contour. Thus the cutter cuts the full predetermined contour, cutting taking place only at the front oblique-angled edges $e$, the rear obtuse-angled edges $f$ being ineffective.

The method involving the use of the single preliminary cutter T is not specifically claimed herein, but is presented and claimed in my copending application for methods of making milling cutters, Serial No. 286,523, filed on even date herewith.

Difficulty is frequently encountered in attempting to mill a cutter in the way illustrated in Figs. 22 to 33. As already stated, the preliminary milling cutter is made as small as possible in order to avoid interference with the front of one tooth while finishing the back of the preceding tooth. Frequently, however, it is impossible to avoid such interference, particularly when there is considerable depth of contour, or when the cutting faces are sharply inclined, or when the degree of relief is large. In such cases, it is necessary to make use of a non-rotary cutting means which can be quickly withdrawn and which of course has no parts located beyond the cutting plane, as is the case with a rotating milling cutter. The non-rotary cutting means consists of either one or two lathe tools. The lathe tools have the additional advantage that no correction is required, as shown in Figs. 20 and 21. When lathe tools are to be used the method is similar to that which is already described except that certain supplemental steps are interposed. Preliminary cutters are constructed as before described and are used to form the proper distorted shapes on lathe tools and then these lathe tools having the distorted shapes are used to cut the final cutters.

While not herein specifically illustrated, a cutter made by means of a lathe tool in the manner to be described may have parts of its contour sharply inclined with respect to the axis, and the outer relieved surface of each tooth may extend backward toward the next following tooth to an extent beyond that to which it could be cut by a preliminary shaped milling cutter such as S. A cutter of this type is set forth in my copending application for milling cutters, Serial No. 368,928, filed March 26th, 1920.

In following this alternate method, either one or two preliminary milling cutters are used to form either one or two lathe tools. For this method no correction of the preliminary cutters is required as shown in Figs. 20 and 21, and the cutters R' S' or T' are similar to the cutters R and S or T respectively, except that no correction has been made. The cutter R' is used as shown in Fig. 34 to mill an intermediate tool U providing the said tool at its cutting face 54 with a distorted contour which is the same as the effective contour of the cutter R'. This distorted contour is illustrated in the plan view in Fig. 35, the contour having points $31^u$, $32^u$, $33^u$, $34^u$ and $35^u$ corresponding respectively to the points $31^r$, $32^r$, $33^r$, $34^r$ and $35^r$ of the effective contour of the cutter R'. It will be observed that the tool U is formed without relief, it being fed perpendicularly to its cutting face 54, as indicated by the arrow in Fig. 34. The intermediate tool U is used, as shown in Fig. 36, for cutting a lathe tool V. The tool V has a cutting face 55 and has its front face 56 inclined with respect to the cutting face to provide the necessary relief. The tool U is set with its cutting face 54 parallel with the cutting face 55 of the tool V, and relative reciprocation is then effected along lines parallel with the front face 56. The result is that the cutting face 56 is formed with a distorted contour which is exactly the same as the distorted contour of the face 54 of the tool U. This distorted contour is shown in Fig. 37 and it has points $31^v$, $32^v$, $33^v$, $34^v$ and $35^v$ corresponding respectively to points $31^u$, $32^u$, $33^u$, $34^u$ and $35^u$ of the tool U.

The cutter S' is used as shown in Fig. 38 to mill an intermediate tool W providing the said tool at its cutting face 57 with a distorted contour which is the same as the effective contour of the cutter S'. This distorted contour is illustrated in the plan view in Fig. 39, the contour having points $41^w$, $42^w$, $43^w$, $44^w$ and $45^w$ corresponding respectively to the points $41^s$, $42^s$, $43^s$, $44^s$ and $45^s$ of the effective contour of the cutter S'. The tool W is also formed without relief, it being fed perpendicularly to its cutting face 57, as indicated by the arrow in Fig. 38. The intermediate tool W is used, as shown in Fig. 40, for cutting a lathe tool X. The tool X has a cutting face 58 and has its front face 59 inclined with respect to the cutting face to provide the necessary relief. The tool W is set with its cutting face 57 parallel with the cutting face 58 of the tool X, and relative reciprocation is then effected along lines parallel with the front face 59. The result is that the cutting face 58 is formed with a distorted contour which is exactly the same as the distorted contour of the face 57 of the tool W. This distorted contour is shown in Fig. 41 and it has points $41^x$, $42^x$, $43^x$, $44^x$ and $45^x$ corresponding respectively to points $41^w$, $42^w$, $43^w$, $44^w$ and $45^w$ of the tool W.

The cutter T' is used as shown in Fig. 42 to mill an intermediate tool Y, providing the said tool at its cutting face 60 with a distorted contour which is the same as the effective contour of the cutter T'. This distorted contour is illustrated in the plan view in Fig. 43, the contour having points $31^y$, $32^y$, $33^y$, $44^y$ and $45^y$ corresponding respectively to the points $31^t$, $32^t$, $33^t$ $44^t$ and $45^t$ of the effective contour of the cutter T'. The tool Y is formed without relief, it being fed perpendicularly to its cutting face 60, as indicated by the arrow in Fig. 42. The intermediate tool Y is used, as shown in Fig. 44, for cutting a lathe tool Z. The tool Z has a cutting face 61 and has its front face 62 inclined with respect to the cutting face to provide the necessary relief. The tool Y is set with its cutting face 60 parallel with the cutting face 61 of the tool Z, and relative reciprocation is then effected along lines parallel with the front face 62. The result is that the cutting face 61 is formed with a distorted contour which is exactly the same as the distorted contour of the face 60 of the tool Y. This distorted contour is shown in Fig. 45 and it has points $31^z$, $32^z$, $33^z$, $44^z$ and $45^z$ corresponding respectively to points $31^y$, $32^y$, $33^y$, $44^y$ and $45^y$ of the tool Y.

Fig. 46 shows the tool V being used for shaping the alternate teeth 1 of the cutter A. It will be understood that the blank is rotated as indicated by the arrow and that the tool V is moved inward and outward in timed relation to the rotation to provide the relief. The timing of the relieving movements is such that the teeth 2 are not engaged. The distortion of the contour of the tool V is just sufficient to offset the distortion which would otherwise take place in the teeth 1 of the cutter A, and the result is that the teeth are formed with the correct effective contour. Fig. 47 shows the tool X being used for shaping the remaining teeth 2 of the cutter A. The operation is the same as that described in connection with the tool W, the timing of the relieving movements being such that the teeth 1 are not engaged. The distortion of the contour of the tool X is just sufficient to offset the distortion which would otherwise take place in the teeth 2 of the cutter A, and the result is that the teeth are formed with the correct effective contour.

Figs. 48 and 49 show the tool Z being used for shaping the teeth of the cutter B. It will be understood that the blank is rotated, as indicated by the arrow, and that the tool Z is moved inward and outward in timed relation to the rotation to provide the relief. In this case the timing of the relieving movements is such that all of the teeth are engaged. Fig. 48 shows the tool Z engaging one of the teeth 9, and Fig. 49 shows the tool Z engaging one of the teeth 10. The tool Z has the same shape as the composite effective contour of the cutter T, and it therefore shapes the teeth 9 and 10 with the obtuse-angled sides reduced, as already fully described in connection with Figs. 26 to 31.

In the present application I present specific claims covering the method involving the use of lathe tools. The method involving the use of the preliminary milling cutters directly for milling the final cutter are presented and claimed in my aforesaid application, Serial No. 286,523.

What I claim is:

1. The herein described method of shaping a relieved milling cutter adapted to cut a predetermined contour other than a straight line and having different cutting faces oppositely inclined with respect to the axis, the method consisting in forming a preliminary cutting means having at planes of intersection transverse to the lines of cutting a shape the same or approximately the same as the predetermined contour, the said preliminary cutting means being provided with oppositely inclined cutting faces each having a degree of inclination bearing a predetermined ratio to the degree of inclination of the cutting faces of the final cutter and being provided with a degree of relief bearing a ratio to the degree of relief of the teeth of the final cutter which is the inverse of the ratio between the degrees of inclination, and in forming the shape of the relieved final milling cutter from the said preliminary cutting means whereby the final cutter is formed with distorted shapes at axial planes of intersection back of the respective oppositely inclined cutting faces but is adapted to cut the correct contour when rotated.

2. The herein described method of shaping a relieved milling cutter adapted to cut a predetermined contour other than a straight line and having different cutting faces oppositely inclined with respect to the axis, the method consisting in forming a preliminary rotary milling means having at longitudinal planes of intersection transverse to the lines of cutting a shape the same or approximately the same as the predetermined contour, the said preliminary milling means being provided with oppositely inclined cutting faces each having a degree of inclination bearing a predetermined ratio to the degree of inclination of the cutting faces of the final cutter and being provided with a degree of relief bearing a ratio to the degree of relief of the teeth of the final cutter which is the inverse of the ratio between the degrees of inclination, and in forming the shape of the relieved final milling cutter from the said preliminary milling means whereby the final cutter is formed with distorted shapes at axial planes of intersection back of the respective oppositely inclined cutting faces but is adapted to cut the correct contour when rotated.

3. The herein described method of shaping a relieved milling cutter adapted to cut a predetermined contour other than a straight line and having different cutting faces oppositely inclined with respect to the axis, the method consisting in forming a preliminary rotary milling means having at longitudinal planes of intersection transverse to the lines of cutting a shape the same or approximately the same as the predetermined contour, the said preliminary milling means being provided with oppositely inclined cutting faces each having a degree of inclination bearing a predetermined ratio to the degree of inclination of the cutting faces of the final cutter and being provided with a degree of relief bearing a ratio to the degree of relief of the teeth of the final cutter which is the inverse of the ratio between the degrees of inclination, in forming a non-rotary cutting means from the said preliminary milling means, and in cutting the relieved final milling cutter with the said non-rotary cutting means whereby the final cutter is formed with distorted shapes at axial planes of intersection back of the respective oppositely inclined cutting faces but is adapted to cut the correct contour when rotated.

4. The herein described method of shaping a relieved milling cutter adapted to cut a predetermined contour other than a straight line and having alternately arranged cutting faces oppositely inclined with respect to the axis, the method consisting in forming two different preliminary milling cutters each having at longitudinal planes of intersection transverse to the lines of cutting a shape the same or approximately the same as the predetermined contour, the said milling cutters being respectively provided with oppositely inclined cutting faces each having a degree of inclination bearing a predetermined ratio to the degree of inclination of the cutting faces of the final cutter and being provided with a degree of relief bearing a ratio to the degree of relief of the teeth of the final cutter which is the inverse of the ratio between the degrees of inclination, and in forming the shape of alternate teeth of the relieved final milling cutter from the said preliminary milling cutters respectively whereby the final cutter is formed with different distorted shapes at axial planes of intersection back of the respective oppositely inclined cutting faces but is adapted to cut the correct contour when rotated.

5. The herein described method of shaping a relieved milling cutter adapted to cut a predetermined contour other than a straight line and having alternately arranged cutting faces oppositely inclined with respect to the axis, the method consisting in forming two different preliminary milling cutters each having at longitudinal planes of intersection transverse to the lines of cutting a shape the same or approximately the same as the predetermined contour, the said preliminary milling cutters being respectively provided with oppositely inclined cutting faces each having a degree of inclination bearing a predetermined ratio to the degree of inclination of the cutting faces of the final cutter and being provided with a degree of relief bearing a ratio to the degree of relief of the teeth of the final cutter which is the inverse of the ratio between the degrees of inclination, in forming two different lathe tools from the said two preliminary milling cutters respectively, and in cutting alternate teeth of the relieved final milling cutter with the said lathe tools respectively whereby the final cutter is formed with different distorted shapes at axial planes of intersection back of the respective oppositely inclined cutting faces but is adapted to cut the correct contour when rotated.

6. The herein described method of shaping a spirally relieved milling cutter adapted to cut a predetermined contour other than a straight line and having different oppositely inclined helicoidal cutting faces, the method consisting in forming a preliminary milling means having at axial planes of intersection a shape the same or approximately the same as the predetermined contour, the said preliminary milling means being provided with oppositely inclined helicoidal cutting faces each having a longitudinal pitch bearing a predetermined ratio to the longitudinal pitch of the cutting faces of the final cutter and being provided with a degree of spiral relief bearing the same predetermined ratio to the degree of spiral relief of the teeth of the final cutter, and in forming the shape of the spirally relieved final milling cutter from the said preliminary milling means whereby the final cutter is formed with distorted shapes at axial planes of intersection back of the respective oppositely inclined helicoidal cutting faces but is adapted to cut the correct contour when rotated.

7. The herein described method of shaping a spirally relieved milling cutter adapted to cut a predetermined contour other than a straight line and having different oppositely inclined helicoidal cutting faces, the method consisting in forming a preliminary milling means having at axial planes of intersection a shape the same or approximately the same as the predetermined contour, the said preliminary milling means being provided with oppositely inclined helicoidal cutting faces each having a longitudinal pitch the same as the longitudinal pitch of the cutting faces of the final cutter and being provided with a degree of spiral relief the same as the degree of spiral relief of the teeth of the final cutter, and in forming the shape of the spirally relieved final milling cutter from the said preliminary milling means whereby the final cutter is formed with distorted shapes at axial planes of intersection back of the respective oppositely inclined helicoidal cutting faces but is adapted to cut the correct contour when rotated.

8. The herein described method of shaping a spirally relieved milling cutter adapted to cut a predetermined contour other than a straight line and having different oppositely inclined helicoidal cutting faces, the method consisting in forming a preliminary milling means having at axial planes of intersection a shape the same or approximately the same as the predetermined contour, the said preliminary milling means being provided with oppositely inclined helicoidal cutting faces having a longitudinal pitch bearing a predetermined ratio to the longitudinal pitch of the cutting faces of the final cutter and being provided with a degree of relief bearing the same predetermined ratio to the degree of relief of the teeth of the final cutter, in forming a non-rotary cutting means from the said preliminary milling means, and in cutting the spirally relieved final milling cutter with the said non-rotary cutting means whereby the final cutter is formed with distorted shapes at axial planes of intersection back of the respective oppositely inclined helicoidal cutting faces but is adapted to cut the correct contour when rotated.

9. The herein described method of shaping a spirally relieved milling cutter adapted to cut a predetermined contour other than a straight line and having alternately arranged oppositely inclined helicoidal cutting faces, the method consisting in forming two different preliminary milling cutters each having at axial planes of intersection a shape the same or approximately the same as the predetermined contour, the said milling cutters being respectively provided with oppositely inclined helicoidal cutting faces each having a longitudinal pitch bearing a predetermined ratio to the longitudinal pitch of the cutting faces of the final cutter and being provided with a degree of spiral relief bearing the same predetermined ratio to the degree of spiral relief of the teeth of the final cutter, and in forming the shape of alternate teeth of the spirally relieved final milling cutter from the said preliminary milling cutters respectively whereby the final cutter is formed with different distorted shapes at axial planes of intersection back of the respective oppositely inclined helicoidal cutting faces but is adapted to cut the correct contour when rotated.

10. The herein described method of shaping a spirally relieved milling cutter adapted to cut a predetermined contour other than a straight line and having alternately arranged oppositely inclined helicoidal cutting faces, the method consisting in forming two different preliminary milling cutters having at axial planes of intersection a shape the same or approximately the same as the predetermined contour, the said preliminary milling cutters being provided respectively with oppositely inclined helicoidal cutting faces each having a longitudinal pitch bearing a predetermined ratio to the longitudinal pitch of the cutting faces of the final cutter and being provided with a degree of spiral relief bearing the same predetermined ratio to the degree of spiral relief of the teeth of the final cutter, in forming two different lathe tools from the said two preliminary milling cutters respectively, and in cutting the alternate teeth of the spirally relieved final milling cutter with the said lathe tools respectively whereby the final cutter is formed with different distorted shapes at axial planes of intersection back of the respective oppositely inclined helicoidal cutting faces but is adapted to cut the correct contour when rotated.

In testimony whereof I hereto affix my signature.

FRIEDERICH MÜLLER.